(12) United States Patent
Goudy et al.

(10) Patent No.: US 8,511,730 B2
(45) Date of Patent: Aug. 20, 2013

(54) APPARATUS AND METHOD FOR ENGAGING AND HANDLING ARTICLES OF MANUFACTURE

(75) Inventors: Eric Shawn Goudy, Liberty Township, OH (US); Michel Kenneth Whetstone, Union Township, OH (US); William Russel Clem, Miami Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 28 days.

(21) Appl. No.: 13/299,627

(22) Filed: Nov. 18, 2011

(65) Prior Publication Data

US 2013/0127195 A1 May 23, 2013

(51) Int. Cl.
*B25J 15/02* (2006.01)

(52) U.S. Cl.
USPC .............................. 294/195; 294/93; 294/902

(58) Field of Classification Search
USPC .............. 294/93, 100, 98.1, 63.2, 86.24, 192, 294/195, 95, 97, 86.25, 96, 902, 99.1, 196, 294/208, 190; 606/114
See application file for complete search history.

(56) References Cited

U.S. PATENT DOCUMENTS

| | | | | |
|---|---|---|---|---|
| 1,649,693 A * | 11/1927 | Hess | | 294/86.14 |
| 2,873,996 A * | 2/1959 | McHugh, Jr. | | 294/90 |
| 3,116,663 A * | 1/1964 | Musgrave | | 89/1.51 |
| 3,434,675 A | 3/1969 | Zuckerman | | |
| 3,831,995 A | 8/1974 | Duncan | | |
| 4,168,073 A | 9/1979 | Larue | | |
| 4,173,368 A * | 11/1979 | Haverbusch | | 294/196 |
| 4,253,694 A * | 3/1981 | Walter et al. | | 294/98.1 |
| 4,291,910 A | 9/1981 | Maupate | | |
| 4,770,456 A * | 9/1988 | Phillips et al. | | 294/93 |
| 4,989,909 A | 2/1991 | Bouligny, Jr. et al. | | |
| 5,029,925 A | 7/1991 | Rietzler | | |
| 6,086,125 A * | 7/2000 | Kovacs et al. | | 294/65.5 |
| 7,025,193 B2 | 4/2006 | Zoppas et al. | | |
| 7,475,927 B2 * | 1/2009 | Maffeis | | 294/93 |
| 2004/0134761 A1 | 7/2004 | Zoppas et al. | | |
| 2007/0212441 A1 | 9/2007 | Ansari et al. | | |

(Continued)

FOREIGN PATENT DOCUMENTS

BE 1008445 5/1996
CN 201056305 Y 5/2008

(Continued)

OTHER PUBLICATIONS

"Airpicker™ Airgripper™, Pneumatic Working Devices for Firm and Precise Holding" Firestone Industrial Products Company, product brochure.

(Continued)

*Primary Examiner* — Saul Rodriguez
*Assistant Examiner* — Gabriela Puig
(74) *Attorney, Agent, or Firm* — David M. Weirich

(57) ABSTRACT

Apparatus and method for engaging an article. The apparatus has a base portion, an end portion disposed adjacent the base portion. The end portion is moveable in relation to the base portion generally along the longitudinal centerline. One or more bands are joined to and extend between the base portion and the end portion. At least one of the bands bends away from the longitudinal centerline when the end portion is moved toward the base portion from the disengaged configuration to the activated configuration.

20 Claims, 7 Drawing Sheets

(56) References Cited

U.S. PATENT DOCUMENTS

| | | |
|---|---|---|
| 2008/0166441 A1 | 7/2008 | Kintzinger et al. |
| 2010/0148529 A1 | 6/2010 | Maffeis |
| 2010/0213728 A1 | 8/2010 | Hoellriegl et al. |

FOREIGN PATENT DOCUMENTS

| | | |
|---|---|---|
| DE | 2107318 | 8/1972 |
| DE | 4227302 | 2/1994 |
| DE | 4325556 | 9/1994 |
| DE | 100 34 541 A1 | 1/2002 |
| DE | 20 2006 017 247 U1 | 3/2007 |
| DE | 10 2008 045 803 A1 | 12/2009 |
| DE | 10 2010 022 869 A1 | 1/2011 |
| EP | 0 574 832 B1 | 3/1996 |
| EP | 1 243 531 B1 | 6/2004 |
| EP | 2 025 598 A1 | 2/2009 |
| EP | 2 316 738 A2 | 5/2011 |
| FR | 2347300 | 11/1977 |
| FR | 2392795 | 12/1978 |
| FR | 2528016 | 12/1983 |
| FR | 2653415 | 9/1994 |
| FR | 2707614 | 11/1995 |
| FR | 2721914 | 9/1996 |
| SU | 562 491 | 6/1977 |
| WO | WO 2008/052371 A1 | 5/2008 |
| WO | WO 2010/118734 A1 | 10/2010 |

OTHER PUBLICATIONS

SAD Automation Introduces Internal Diameter Gripper—smaller version, Press Release, SAS Automation, May 2010.

"IDG 25 80-110 Internal Diameter Gripper" Datasheet, SAS Automation.

"ID Gripper: Grip parts from the inside", BIMBA Solutions Shop, 2009.

PCT International Search Report and Written Opinion dated Feb. 6, 2013.

* cited by examiner

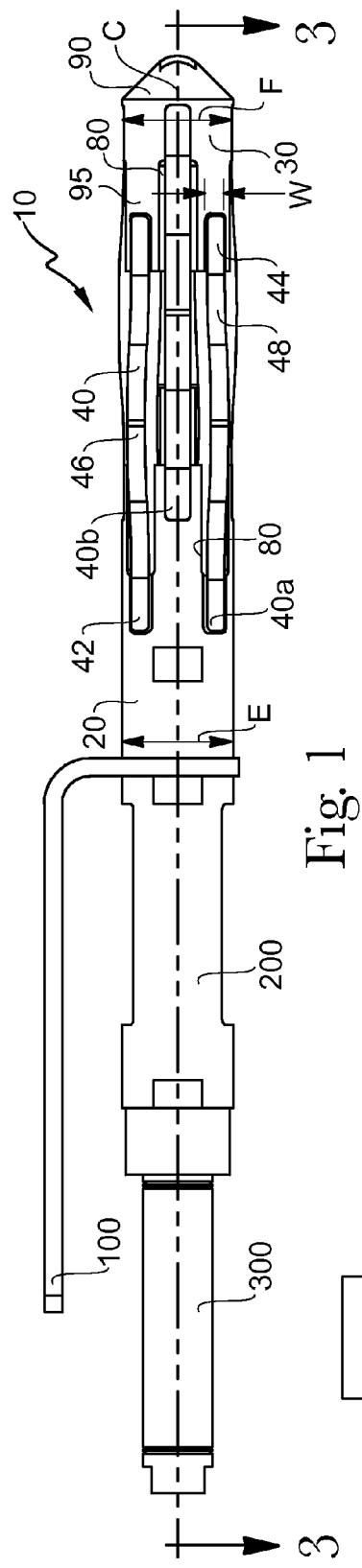
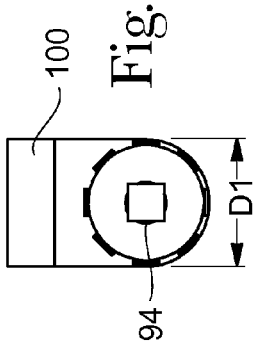
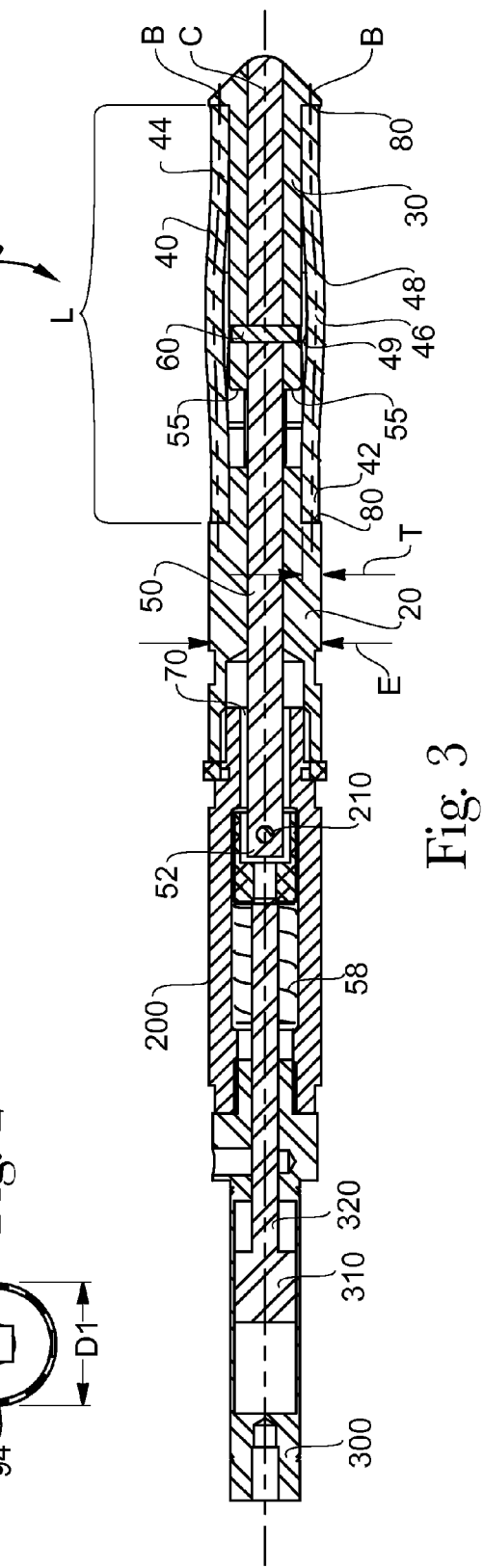
Fig. 1
Fig. 2
Fig. 3

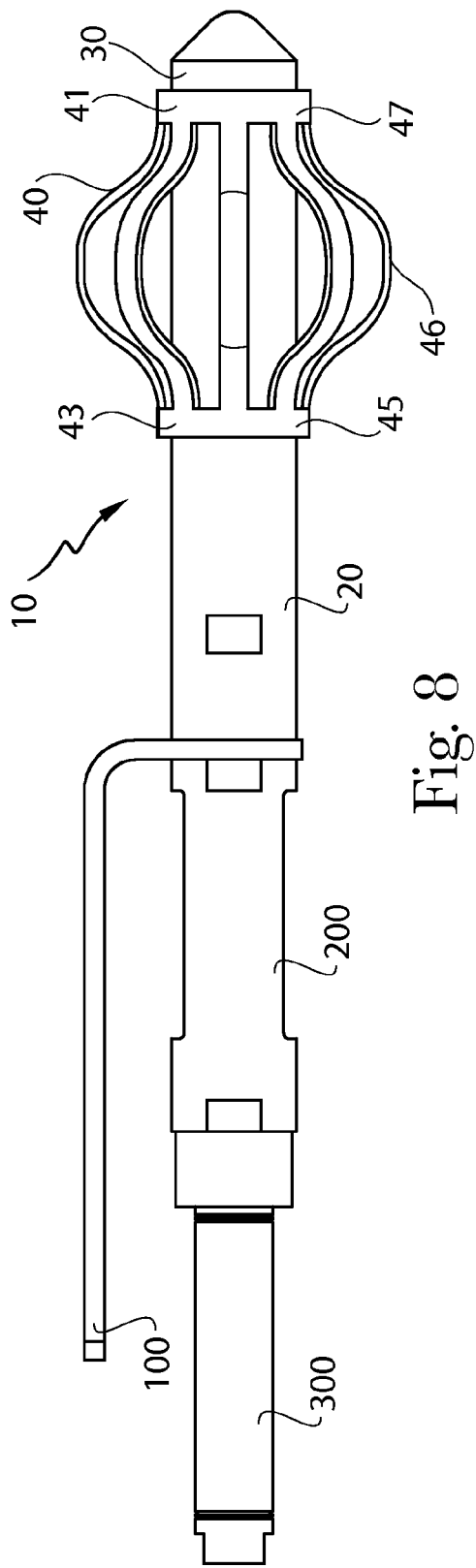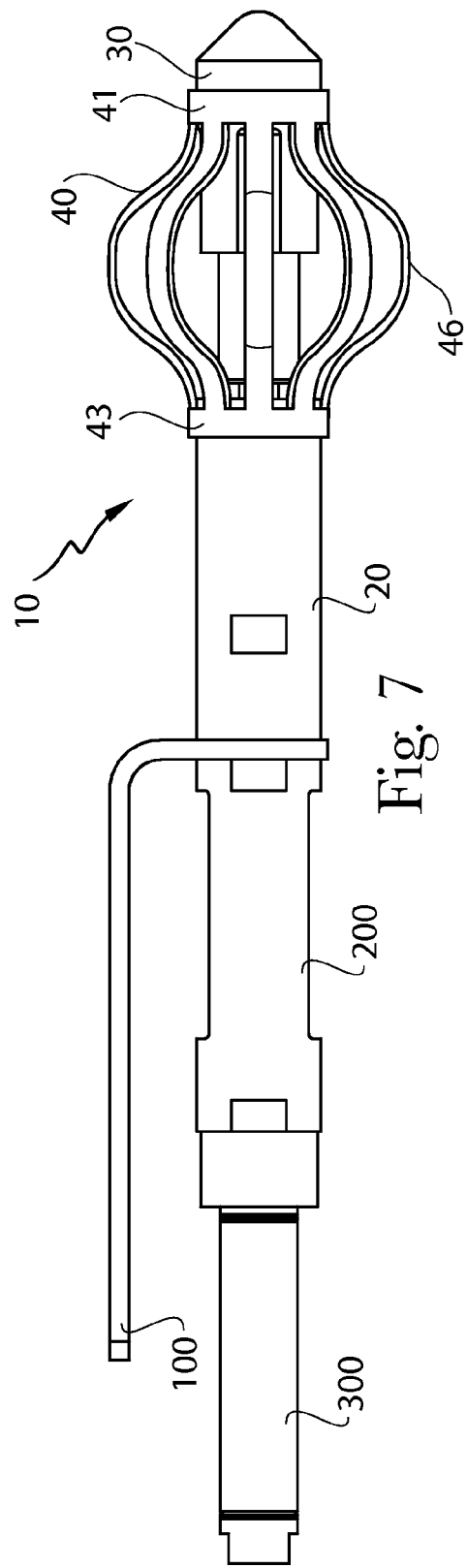

APPARATUS AND METHOD FOR ENGAGING AND HANDLING ARTICLES OF MANUFACTURE

FIELD OF THE INVENTION

The present invention relates to an apparatus and method for engaging and handling articles of manufacture. More specifically, the invention relates to a method and an apparatus for picking up, holding and/or handling articles, such as packages.

BACKGROUND OF THE INVENTION

The use of machines and automated equipment is abundant in modern manufacturing processes. In fact, in modern society, very few articles of manufacture are made completely by hand without the use of tools, machines or robots. As such, there is often a need for the equipment to engage the article being manufactured in some way during its manufacture, processing or packaging. The present invention provides an improved apparatus and method for engaging and/or handling articles, such as, for example, articles of manufacture or parts thereof One suitable use for the present invention is to pick up and/or handle packages, such as, for example, empty bottles, tubes or cartons.

Over the years, there have been many developments related to manufacturing techniques and equipment, including how the manufacturing equipment interacts with, or engages, articles being manufactured, processed or packaged. Initially, manufacturing steps often included many humans to pick up, hold and handle articles being manufactured or processed. Soon, however, it was evident that to improve safety, increase speed of production and increase reliability, human hands would need to be replaced by mechanical devices on manufacturing lines. To that end, conveyors and other processing equipment was developed. However, even with improvements in manufacturing equipment, there remained a need to load and unload the conveyors, to position articles during the manufacturing process and, in some cases, to manipulate the articles for packaging, etc.

Mechanical claws, hooks, chucks and other gripping devices have been used to engage and handle certain articles of manufacture with a great deal of success. However, such devices are often complex, having many moving parts, and expensive to make and/or replace. Further, such know gripping devices are often specially designed for one particular type of article and cannot be effectively used to engage and handle articles having different sizes, shapes and/or materials. Thus, when used with different shapes, sizes or numbers of articles, know engaging devices can present negative consequences, such as, for example, a decrease in speed of handling, damage to equipment and/or products and/or the need to have different engaging devices for different articles of manufacture, even if they are otherwise processed on the same manufacturing line.

Thus, it would be beneficial to provide an article engaging apparatus that is simple and inexpensive to make and that can be used with modern manufacturing processes. It would also be advantageous to provide an article engaging apparatus that is versatile enough to be used with different products and/or packages. Further, it would be desirable to provide a method for using such an apparatus alone or in combination with other equipment.

SUMMARY OF THE INVENTION

In order to solve one or more of the problems with the prior art and/or to provide one or more of the benefits set forth herein, the present invention is directed to an apparatus for engaging an article. The apparatus has a longitudinal centerline, a disengaged configuration with a disengaged cross-section and an activated configuration with an activated cross-section. The apparatus also includes a base portion; an end portion disposed adjacent the base portion along the longitudinal centerline of the apparatus, the end portion being moveable in relation to the base portion generally along the longitudinal centerline of the apparatus; and one or more bands extending between the base portion and the end portion, the band having a first end joined to the base portion, a second end joined to the end portion and a central region located between the first end and the second end. At least one of the one or more of the band bends away from the longitudinal centerline of the apparatus when the end portion is moved toward the base portion from the disengaged configuration to the activated configuration.

The present invention also provides an apparatus for engaging an article, the apparatus having a longitudinal centerline, a disengaged configuration and an activated configuration, the apparatus comprising: a base portion; a first engaging arm portion joined to the base portion, the first engaging arm having a first base end portion and a first free end portion disposed along a first longitudinal centerline away from the base portion; a first moveable portion operatively associated with the first engaging arm portion and being moveable in relation to the first free end portion generally along the first longitudinal centerline; a second engaging arm portion joined to the base portion, the second engaging arm having a second base end portion and a second free end portion disposed along a second longitudinal centerline away from base portion; a second moveable portion operatively associated with the second engaging arm portion and being moveable in relation to the second free end portion generally along the second longitudinal centerline; one or more first engaging arm bands extending between the first moveable portion and the first free end portion, the bands having a first proximal end joined to the first moveable portion, a first distal end joined to the first free end portion and a first central region located between the first proximal end and the first distal end; and one or more second engaging arm bands extending between the second moveable portion and the second free end portion, the bands having a second proximal end joined to the second moveable portion, a second distal end joined to the second free end portion and a second central region located between the second proximal end and the second distal end, wherein at least one of the one or more of the first engaging arm bands bends away from the first longitudinal centerline of the first engaging arm when the first moveable portion is moved toward the first free end portion from the disengaged configuration to the activated configuration.

The present invention also provides an apparatus for engaging an article having, the apparatus having a longitudinal centerline, a disengaged configuration with a disengaged cross-section and an activated configuration with an activated cross-section. The apparatus also includes a base disposed generally along the longitudinal centerline of the apparatus, the base having a first end and a second end; and a sleeve surrounding at least a portion of the base, the sleeve portion having a proximal end and a distal end and one or more one or more bands extending between the proximal end and the distal end, the proximal end of the sleeve being joined to the base at a fixed location and the distal end of the sleeve being moveable with respect to the proximal end along the base. At least one of the one or more band bends away from the longitudinal centerline of the apparatus when the distal end of the sleeve is moved toward the proximal end of the sleeve along the base from the disengaged configuration to the activated configuration.

Also provided are methods for using the apparati of the present invention.

BRIEF DESCRIPTION OF THE DRAWINGS

FIG. 1 is a plan view of one embodiment of the present invention shown along with related equipment.

FIG. 2 is an end view of the device shown in FIG. 1.

FIG. 3 is a cross-sectional view of the device shown in FIG. 1, through line 3-3.

FIG. 7 is a plan view of an alternative embodiment of the present invention.

FIG. 8 is a plan view of an alternative embodiment of the present invention.

DETAILED DESCRIPTION OF THE INVENTION

The present invention is directed to an apparatus and method for engaging and/or handling articles, such as articles of manufacture and/or packages. The figures herein and accompanying description specifically describe certain embodiments of the invention. However, the figures and description are not intended to limit the scope of the invention, but rather, provide a context in which the full scope of the invention can be understood. As such, the claims are not limited to any particular embodiment described and/or shown herein, but rather are intended to cover the entire scope of the invention, including variations of the invention and any elements thereof, as well as combinations of any one or more of the elements or components described herein with any one or more of such elements or other elements even if not but not expressly exemplified in such a combination. Further, although the use of the apparatus and method of the present invention may be described in terms of how the apparatus of the invention may interact with certain exemplary articles, the use and method of use is not intended to be limited to any particular use or method, except as specifically limited by the claims. Further still, the use of the terms "article of manufacture" or "article" are not intended to be limiting, but rather are used to describe a broad range of articles for which interaction or engagement by a piece of equipment may be desired including the article itself that is being manufactured or processes, ingredients or parts thereof and/or packaging for one or more of the articles or parts thereof Thus, the purpose for which the article is being engaged is not important and such engagement can happen during manufacture, processing, packaging, disposal or at any other time of an article's existence.

FIG. 1 is a plan view of one embodiment of the engaging apparatus 10 of the present invention shown with certain other structural elements that may be desirable when the engaging apparatus 10 is used. For example, the engaging apparatus 10 is shown joined to a mounting bracket 100, an adapter housing 200 and a cylinder 300. The mounting bracket 100 can be used to mount the engaging apparatus 10 to equipment, machines, tools, support structures, framework or any other apparatus desired for the particular purpose. The adapter housing 200 is optional and can take on any shape or configuration that is desired. The mounting bracket 100 may be constructed of metal, plastic, wood or any other suitable material. Further, the mounting bracket 100 can be integrally formed with the engaging apparatus 10 or separately formed and joined directly or indirectly by any suitable means to the engaging apparatus 10.

Figure 4:
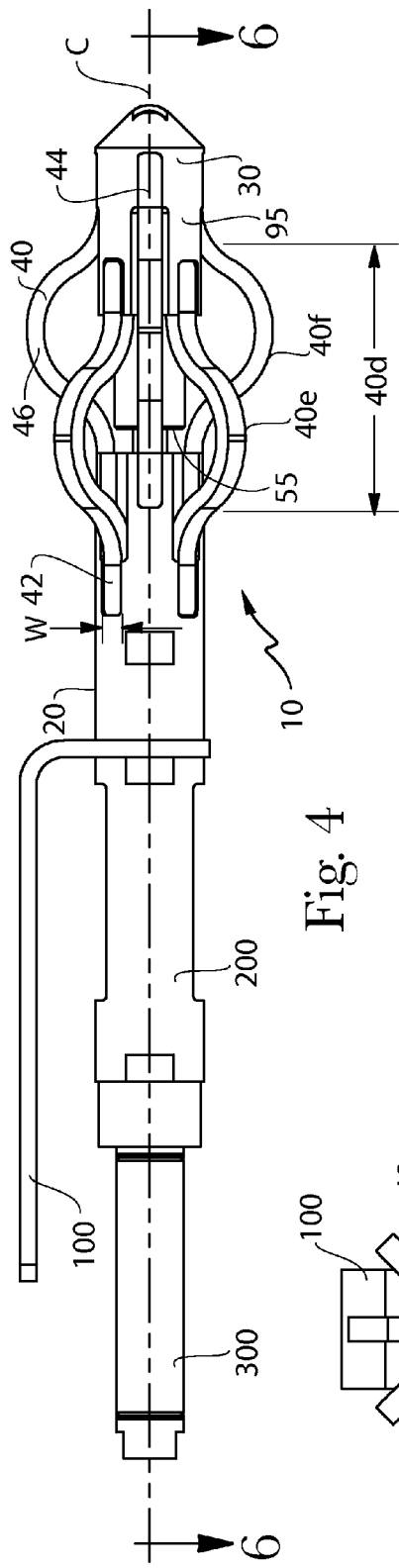
FIG. 4 is a plan view of one embodiment of the present invention along with related equipment, wherein the device has been activated for engaging an article.
Figure 5:
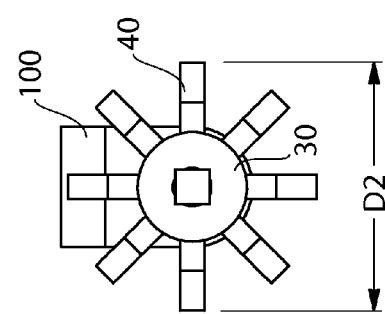
FIG. 5 is an end view of the device shown in FIG. 4.
Figure 6:
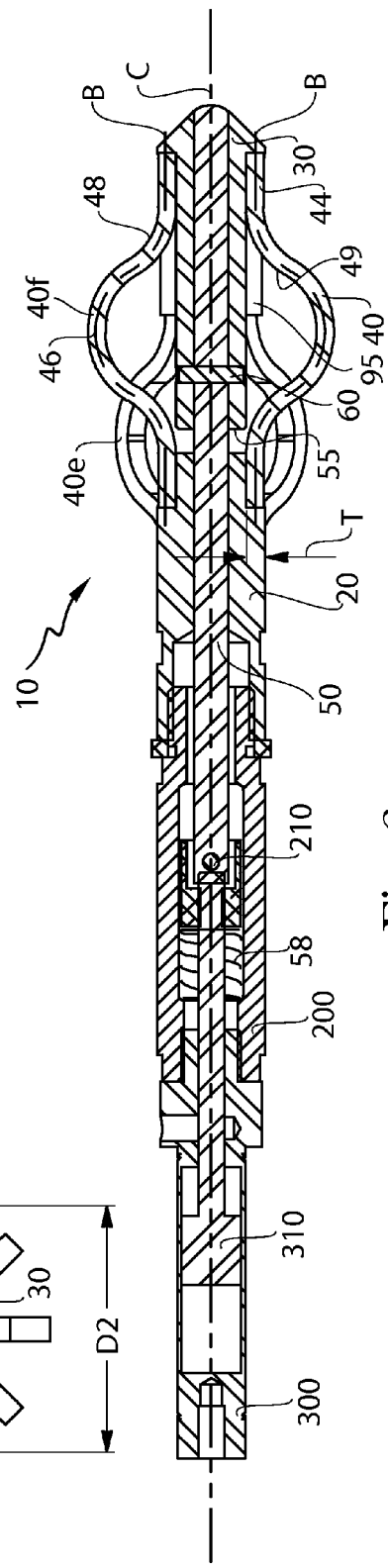
FIG. 6 is a cross-sectional view of the device shown in FIG. 4, through line 6-6.

In the embodiment of the engaging apparatus 10 shown in FIG. 1, the engaging apparatus 10 includes a base portion 20, an end portion 30 and bands 40. The end portion 30 is moveable with respect to the base portion 20 along at least the longitudinal centerline C and at least one band 40 extends between the base portion 20 and the end portion 30. FIGS. 1-3 show the engaging apparatus 10 in a fully extended or disengaged configuration wherein at least one band longitudinal centerline B is generally parallel to the longitudinal centerline C of the apparatus 10. FIGS. 4-6 show the engaging apparatus 10 in an engaging or activated configuration wherein at least one band longitudinal centerline B is at least partially non-parallel to the longitudinal centerline C of the apparatus 10.

The base portion 20 is adapted to hold the proximal end 42 of the band(s) 40 and to provide a structure to or from which the end portion 30 can be moved. Although the engaging apparatus 10 may have a single band 40, to simplify the description of the invention, it is shown in the accompanying figures and otherwise described herein as having two or more bands 40. Further, the base portion 20 may be directly or indirectly joined to a mounting bracket 100 and/or other structure, as desired. For example, in FIGS. 1 and 3, the base portion 20 may be joined to adapter housing 200, which is described in more detail below. The base portion 20 may be any shape or size desired and may be made of any suitable material or materials. For example, the base portion 20 may have a circular or non-circular cross-section and may be made from materials such, for example, metal, plastic, wood, glass and combinations thereof.

The base portion 20 may include structural features to help locate and/or hold the bands 40 to the base portion 20. For example, as shown in FIG. 3, the base portion 20 may include one or more recesses 80 into which a portion of one or more of the bands 40 can be located. In addition or alternatively, the base 20 may include other structural features such as raised regions, areas of reduced or increased coefficients of friction, fasteners, adhesives, cohesive, clamps, pins, or any other suitable fastening means to hold or locate the bands 40 with respect to the base portion 20.

In the embodiment shown in FIGS. 1 and 3, the base portion 20 includes an opening 70 through which at least a portion of a shaft, such as shaft 50, can extend. Although the embodiment shown has a single shaft 50, embodiments are contemplated where more than one shaft 50 is used or where no shaft 50 is used. The opening 70 may be configured to allow the shaft 50 to move within the opening 70 along at least the longitudinal centerline C. However, the shaft 50 may extend from any portion of the base portion 20 to the end portion 30. The shaft 50 may be integral with the end portion or may be separately formed and joined thereto either directly or indirectly. For example, as shown in FIG. 3, the shaft 50 may be joined to the end portion 30 by pin 60 or any other suitable means for joining the shaft 50 to the end portion 30. In an alternative embodiment, the shaft 50 may be joined to the base portion 20 and extend from the base portion 20 to the end portion 30.

The shaft 50 can be solid or hollow, and can be made of made of any material or materials suitable for the work that the engaging apparatus 10 will perform. For example, the shaft 50 may include metals, plastics, glass, wood, or any other suitable material or combinations thereof In addition, the shaft 50 can take on any suitable shape. For example, the shaft may have a circular cross-section, a rectangular cross-section or have any other cross-section suitable for the desired end use of the apparatus 10. A shaft 50 with a circular cross-section can be designed to allow the shaft 50 and/or the end portion 30 to rotate about an axis generally parallel to the length of the shaft 50, and in some cases, parallel to the longitudinal centerline C. A shaft 50 that is other than circular in cross-section can be designed to not rotate in the opening 70 and/or with respect to the end portion 30. The use of more than one shaft 50 can also act to limit rotation. The shaft 50 can also be designed to impart rotation to itself or the end portion 30 by incorporating raised regions and/or indentations that can interact with opposing indentations and/or raised regions in the opening 70. Such raised regions/indentations can act like threads on a screw to impart rotation to the shaft 50 and/or end portion 30 when the end portion 30 is moved relative to the base portion 20.

The end portion 30 is that portion of the engaging apparatus 10 that is moveable in relation to the base portion 20 and which is generally intended to be directed toward an article of manufacturer when the engaging apparatus 10 is in use. The end portion 30 is also adapted to hold the distal ends 44 of the bands 40. The end portion 30 has a free end region 90 and a base end region 95. The base end region 95 is located closest to the base portion 20 and the free end region 90 is disposed away from the base portion 20.

The end portion 30 may be any shape or size desired and may be made of any suitable material or materials. For example, the end portion 30 may have a circular or non-circular cross-section and may be made from materials such, for example, metal, plastic, wood, glass and combinations thereof. The end portion 30 may be of the same general cross-section as the base portion 20, but it need not be so. In certain embodiments, the end portion 30 may vary in dimensions along its length. For example, as shown in FIGS. 1 and 3, the free end region 90 may be partially tapered to be smaller in cross-section or otherwise different in cross-section than other regions of the end portion 30. The end portion 30 may also include structure and/or means for engaging a product of manufacture. Thus, for example, the end portion 30 may include a suction cup, a vacuum, a sticky or high friction material, be in a shape to snap or otherwise engage a product of manufacture, have the ability to change size and or shape to engage a product and/or have threads or other structure to engage a product.

As with the base portion 20, the end portion 30 may include an opening 94 through which at least a portion of the shaft 50 can extend. The opening 70 may be configured to allow the shaft 50 to move within the opening 70 along at least the longitudinal centerline C. Alternatively, as shown in FIG. 3, the shaft 50 may be held in place with respect to the end portion 30. This can be accomplished by any known means or structure, including friction, fasteners, adhesives, cohesive, clamps, pins, or any other suitable holding means. In yet another embodiment, the shaft 50 may be integrally formed with the end portion 30.

The end portion 30 may also include structural features to help locate and/or hold the distal ends 44 of the bands 40 to the end portion 30. For example, as shown in FIG. 3, the end portion 30 may include one or more recesses 80 into which a portion of one or more of the bands 40, for example the distal end(s) 44, can be located. In addition or alternatively, the end portion 30 may include other structural features such as raised regions, areas of reduced or increased coefficients of friction, fasteners, adhesives, cohesive, clamps, pins, or any other suitable fastening means to hold or locate the bands 40 with respect to the end portion 30.

In certain embodiments, the end portion 30 may be a structure that is an extension of the base portion 20 and operatively associated therewith by means of a shaft 50 or other structure. In other embodiments, however, the end portion 30 may include one or more elements to which the bands 40 may be attached that can move relative to the base portion 20. For example, the base portion 30 could be a ring that is disposed about an extension of the base portion 20 that can move relative to the base portion 20. In other embodiments, the end portion 30 can include one or more elements that extend from the base portion 20 and to which the bands 40 are attached. In any case, a structure is provided that holds one end of the bands 40 such that they can be moved relative to the other end of the bands 40 and the base portion 20.

The engaging apparatus 10 also includes at least one band 40 that extends from the base portion 20 to the end portion 30. As used herein, the term "band" is not intended to limit the structure of the element extending between the base portion 20 and the end portion 30, but rather, is used to generally describe that feature. Thus, the term does not limit the shape, size, orientation material or any other aspect of the feature, except as specifically set forth herein.

The bands 40 have a proximal end 42, a distal end 44 and a central region 46 extending between the proximal end 42 and the distal end 44. At least a portion of the proximal end 42 is joined to the base portion 20 and at least a portion of the distal end 44 is joined to the end portion 30. At least a portion of the central region 46 is not joined to the base portion 20 or the end portion 30. This allows the central region 46 to move relative to the base portion 20 and the end portion 30, as desired. Specifically, as shown in FIGS. 4-6, the central region 46 of the bands 40 is capable of moving relative to the longitudinal centerline C of the engaging apparatus 10. In the embodiment shown in FIGS. 1-3, the bands 40 are disposed generally parallel to the longitudinal centerline C of the engaging apparatus 10, whereas in FIGS. 4-6, the same bands 40 have been flexed such that the central portion 46 of each band 40 is disposed away from the longitudinal centerline C and such that the longitudinal centerline B of the bands 40 is not parallel to the longitudinal centerline C of the apparatus 10.

As noted above, the engaging apparatus 10 shown in FIGS. 1-3 is shown in a fully extended or disengaged configuration. That is, the end portion 30 is disposed away from the base portion 20. In the fully extended configuration, the bands 40 are disposed generally parallel to the longitudinal centerline C of the engaging apparatus 10. This can be accomplished by positioning the end portion 30 far enough away from the base portion 20 such that at least one of the bands 40 is relatively planar. In certain embodiments, in the fully extended configuration, all of the bands 40 may be relatively planar and in others only some of the bands 40 may be relatively planar and the other(s) may be at least somewhat flexed. Further, in certain embodiments, one or more of the bands 40 may be stretched beyond its relaxed state.

In a disengaged configuration, as shown in FIG. 2, the apparatus 10 has a disengaged cross-section D1. The disengaged cross-section D1 is the maximum cross-section of the apparatus 10 taken perpendicular to the longitudinal centerline C, as shown in FIG. 2, when the end portion 30 is disposed as far from the base portion 20 as is intended in normal use. Although the disengaged cross-section D1 is shown herein as the diameter of the apparatus 10 having a generally circular cross-section, the apparatus 10 of the present invention need not have a generally circular cross-section. As such, the disengaged cross-section D1, as used herein, is the greatest distance across the cross-section of the apparatus 10 taken perpendicular to the longitudinal centerline C when the apparatus 10 is in its disengaged configuration.

The engaging apparatus 10 shown in FIGS. 4-6 is shown in a fully contracted or "activated" configuration. In an activated configuration, the base end region 95 of the end portion 30 is disposed closer to the base portion 20 than when the engaging device 10 is in a fully extended or disengaged configuration. Thus, at least one of the bands 40 is not fully extended, but rather, is flexed and the central region 46 is non-parallel to the longitudinal centerline C of the engaging apparatus 10. This can be accomplished by moving the base end region 95 of the end portion 30 from a fully extended configuration toward the base portion 20. In certain embodiments, in an activated configuration, all of the bands 40 may be flexed and relatively non-planar with respect to the longitudinal centerline C of the engaging apparatus 10. In other embodiments, only some of the bands 40 are relatively non-planar and one or more others may be generally planar and non-flexed.

The bands 40 may take on any suitable configuration and may be of any suitable size, shape and/or material(s). In certain embodiments, one or more of the bands 40, or portions thereof, may be integrally formed with one or both of the base portion 20 and the end portion 30. In other embodiments, one or more of the bands 40, or portions thereof, may be formed separately from the base portion 20 and/or the end portion 30 and joined thereto by any suitable structure or means. For example, one or more of the bands 40 may be joined to either or both of the base portion 20 and the end portion 30 with an adhesive. Otherwise, the joined portion of the band 40 may be joined to the base portion 20 and/or end portion by fusing, one or more a pins, clasps, friction, other fastening devices, cohesive, clamps or any other suitable fastening structure and/or means. One or both of the ends of the bands may be permanently or releasably fixed to the base portion 20 or end portion 30 to which it is joined.

The bands 40 may be joined or affixed to the end portion 30 or base portion 20 at any desired location and in any desired configuration. For example, in the embodiment shown in FIGS. 1-6, the bands 40 are joined in a configuration generally parallel to the longitudinal centerline C. However, the bands may be joined perpendicular thereto or at any angle or in any other desired configuration. In certain embodiments, the proximal ends 42 of the bands will all be affixed to the base portion 20 and/or end portion 30 at approximately the same location along the longitudinal centerline C. In other embodiments, one or more of the bands 40 will be affixed to the base portion 20 and/or end portion 30 at different locations along the longitudinal centerline C with respect to other bands 40. For example, as shown in FIGS. 1 and 4, band 40a is joined to base portion 20 longitudinally farther away from the end portion 30 than is band 40b. Further, band 40b is joined to end portion 30 longitudinally farther from base portion 20 than is band 40a. This is just one exemplary configuration of the bands, but provides for a larger engagement area 40d than if all bands 40 were the same length L and joined to the base portion 20 and the end portion 30 in approximately the same longitudinal locations as all other bands 40. In other words, the offset bands 40 may provide at least two different engagement points 40e and 40f which form the maximum diameter D2 and those points may be located at different locations along the longitudinal centerline C. This can provide for a stronger engagement with the article or provide other benefits such as more stability and/or the ability to better engage articles with varying dimensions. In an exemplary embodiment, the different engagement points 40e and 40f may be between about 0.1 mm and about 1000 mm apart, 1 mm and 100 mm apart, 2 mm and 100 mm apart or any other distance that is useful for the desired application of the apparatus 10.

In some embodiments, the engagement area 40d can be enlarged by ensuring the at least one of the bands 40 is longer than the minimum needed to just touch the product it is engaging when the apparatus 10 is fully activated. Rather, the apparatus can be adapted such that an extended portion of central region 46 of the band 40 touches the article when the device is in an engaging or activated configuration. In certain embodiments, it may be desirable to offset one or more of the bands 40 and to use bands 40 of a sufficient length to provide an extended engagement area on one or more of the bands 40. In any case, the length of the engagement area is not limited in any way and can be chosen to meet the needs of the application in which the apparatus 10 is being used.

The bands 40 may be of any desired length L, width W and thickness T. The length L of the bands 40 generally influences the activated cross-section D2 of the engaging device 10 when it is in a fully activated configuration. The activated cross-section D2 is the maximum cross-section of the apparatus 10 taken perpendicular to the centerline C, as shown in FIG. 5, when the end portion 30 is disposed as close to the base portion 20 as is intended in normal use.

As noted above, in a fully activated configuration, the end portion 30 is disposed as close to the base portion 20 as is intended for normal use. In certain embodiments, this can occur when at least a portion of the base end region 95 of the end portion 30 is in contact with the base portion 20. In other embodiments, the shaft 50 could include a stop 55 that can interact with a predetermined part of the base portion 20 (or end portion 30 if the shaft 50 moves relative to the end portion 30) to prevent the end portion 30 from moving beyond a certain predetermined location. The extent of activation may be controlled by electronics, a computer, linkage or other mechanical means, and/or any other system or device that influences or sets the amount of travel between the end portion 30 and the base portion 20.

The individual bands 40 may all have the same width W or some or all may have different widths W. Bands 40 with different widths W can provide for different engaging forces of the engaging apparatus 10 when the apparatus 10 is activated. For example, one or more of the bands 40 may be wider than the rest such that when activated, the wider bands provide a stronger engaging force in certain predetermined locations. This is one feature that allows the user to configure the engaging device 10 for very specific uses and permits it to be used for different uses without the need to change the device. In one exemplary embodiment, the width W of the bands 40 is between about 1 mm and about 100 mm, between about 2 mm and about 50 mm, between about 4 mm and about 20 mm, although other widths W are possible and may be desirable for the particular end use of the engaging apparatus 10.

The individual bands 40 may be all be the same length L or some or all may have different lengths L. Bands 40 with different lengths L can provide for different diameters of the engaging apparatus 10 is activated. For example, one or more of the bands 40 may be shorter than the rest such that when activated, those shorter bands do not flex outwardly from the centerline C as much as the longer bands do. This is one feature that allows the user to configure the engaging device 10 for very specific uses and permits it to be used for different uses without the need to change the device. In one exemplary embodiment, the length L of the bands 40 is between about 10 mm and about 10,000 mm, between about 50 mm and about 5000 mm, between about 80 mm and about 2000 mm, although other lengths L are possible and may be desirable for the particular end use of the engaging apparatus 10.

The bands 40 may have any desired thickness T. The thickness T of the bands 40 can be the same for all bands 40 or can be different for one or more of the bands 40. In the embodiment shown in FIG. 3, the thickness T of the bands 40 is less than the maximum cross-section E of the base portion 20 and/or maximum cross section F of the end portion 30 to which the band 40 is attached. In certain embodiments, the thickness T of one or more of the bands 40 can vary along its length L. The thickness T of the bands 40 can be chosen based on the particular use intended for the apparatus 10. For example, the thickness T of the bands 40 can influence the force that is presented to an article of manufacture when the apparatus 10 is used to engage and/or handle such an article. In one embodiment, articles of manufacture such as bottles with rigid walls may be effectively engaged by apparatus 10 with relatively thick bands 40 whereas for an easily deformable article, it may be more desirable to choose thinner and more flexible bands 40. For typical industrial uses such as, for example, picking up and transferring packages, the thickness T of the bands 40 may range from about 0.01 mm to about 100 mm, between about 0.1 mm and 75 mm, between 2 mm and 60 mm, although other thicknesses T are possible and may be desirable for the particular end use of the engaging apparatus 10.

The bands 40 may be made of any suitable material or materials. For example, the bands 40 may be made of plastic, metal, rubber such as, for example neoprene rubber, paper, woven or non-woven materials and/or any other suitable materials. Further, the bands 40, or any portion thereof, may be coated or treated with any other material to change, for example, their physical or chemical characteristics. Thus, the exterior surface 48 and/or the interior surface 49 of one or more of the bands 40 may be altered to provide any desired surface characteristic. In certain examples, it may be desirable to roughen, smoothen, or otherwise increase or decrease the coefficient of friction of a portion of a surface or otherwise modify a surface or portion of one or more of the bands 40. Likewise, it may be desirable to strengthen or weaken a portion of one or more of the bands 40. For example, the bands 40 may include one or more grooves or slits extending partially through the thickness of the band 40 to influence the shape of the band when in an activated configuration or to otherwise provide some desired property. In certain embodiments, one or more portions of one or more bands 40 may be hardened to influence the shape of the band 40 when activated. Also, the bands 40 may have one or more layers or the same or different materials. For example, one or more of the bands 40 may have a rubber layer and a metal layer or any other combination of the same or different materials. In one embodiment, one or more of the bands may include a 2-ply material consisting of PVC and polyester. One such material that has shown to work satisfactorily is a 0.11 inch thick belt material with stock code 2W2-17AB from F.N. Sheppard & Co. of Erlanger, Ky.

In certain embodiments of the present invention, an example of which is shown in FIG. 7, one or more of the bands 40 may be formed from a unitary material or structure. For example, the bands 40 may be formed from a sleeve 41 of material that is slipped onto or otherwise disposed around a portion of the base portion 20 or the end portion 30. The bands 40 may be formed by slitting the sleeve 41 into longitudinal bands or be otherwise pre-formed as bands with a unitary portion 43 from which the bands extend. The sleeve 41 can have a unitary portion disposed on the base portion 20 or the end portion 30, or both. As shown in FIG. 7, sleeve 41 has a unitary portion 43 disposed on the base portion 20 and on the end portion 30 with bands 40 extending therebetween. In other embodiments, the sleeve 41 may have a unitary portion 43 joined to the base portion 20 and the opposing ends of the bands 40 joined directly to the end portion 30 or vice-versa.

The embodiment of the present invention shown in FIG. 1 is joined to an adapter housing 200 and a cylinder 300. The cylinder 300 provides a mechanism for moving the end portion 30 with respect to the base portion 20 and thereby activating or deactivating the engaging device 10. In the embodiment shown in FIG. 3, the cylinder is an air cylinder including a piston 310 that is moveable within the cylinder 300 in a direction generally parallel to the longitudinal centerline C. As shown, the piston 310 may be operatively associated with a cylinder shaft 320. The cylinder shaft 320 may extend outwardly from the piston 310 toward the base portion 20. In certain embodiments, the cylinder shaft 310 passes through the adapter housing 200 to the proximal end 52 of the shaft 50. The cylinder shaft 320 may be joined to or otherwise operatively associated with the shaft 50 such that when the piston 310 moves, it moves the shaft 50. In embodiments as shown in FIGS. 1-6, the end portion 30 will move with the shaft 50. In alternative embodiments, the cylinder shaft 320 can extend to the end portion 30 or the shaft 50 can extend to the piston 310. Further, the cylinder shaft 320 and/or the shaft 50 may be joined to other extensions or other structure, as desired.

The cylinder 300 is just one example of a mechanism for providing relative movement to the end portion 30 and base portion 20. In addition or alternatively, the engaging apparatus 10 may be associated with any number of air cylinders, hydraulic cylinders, servo motors, or any other device or devices for providing the desired motion to the shaft 50. Air cylinders have been found to be especially suitable for certain end uses related to the engaging and handling of packages because they are relatively inexpensive, the run cleanly, they can be easily adjusted and they do not take up much space. The mechanism for providing relative movement can be located within the apparatus 10, adjacent thereto or remote therefrom. In one example, a cylinder 300 is located within the shaft 50. In another, a cylinder 300 is located adjacent to the apparatus 10, separated by an adapter housing, such as the housing shown in FIGS. 1-6.

The adapter housing 200 is optional and can be any suitable shape or size. As shown, the adapter housing 200 provides a structure to which the engaging apparatus 10 and the cylinder 300 may be joined. This adapter housing 200 provides an efficient way to associate the engaging apparatus 10 with a source of energy to move the shaft 50 and/or the end portion 30. In the embodiment shown, there is a coupling 210 for joining the shaft 50 with the cylinder shaft 320.

In an alternative embodiment of the present invention, as shown in FIG. 8, the apparatus 10 could be formed by moveably attaching one or more flexible bands 40 to a base 20. In this embodiment, the bands 40 themselves are moved with respect to the base 20 to provide the change in diameter of the apparatus 10. In one embodiment, the bands 40 are formed from a sleeve, similar to the sleeve 41 described above. In such embodiments, the sleeve 41 may be slipped onto the base 20 and at least a portion of the sleeve 41, generally one end or the other, is held in place with respect to the base 20. For example, fixed portion 45 may be fixed to the base 20 and moveable end 47 may remain unattached to the base 20. As such, the unattached end 47 may be moved toward the fixed end 45 to flex the bands 40 (i.e. activate the device) and moved away from the fixed end 45 to deactivate the device 10 and return the bands 40 to a state where they are generally parallel to the longitudinal centerline C of the base 20. The moveable end 47 of the sleeve 41 can be moved by any suitable means or mechanism, including those described herein with respect to the movement between the base portion 20 and the end portion 30. In at least one embodiment, the unattached end 47 can be joined to a structure like an arm that is moved, as desired, to activate or deactivate the apparatus 10.

The apparatus 10 of the present invention or any element joined thereto may include a spring 58, as shown, for example, in FIGS. 3 and 6 or other means for returning the apparatus 10 to the activated or deactivated state. For example, it may be desirable for the apparatus 10 to remain activated except when the end portion 30 is moved and held in place away from the base 20. Alternatively, it may be desirable for the apparatus 10 to remain deactivated except when the end portion 30 is moved and held in place toward the base 20. Such configurations can help reduce energy usage and/or provide the desired configuration if power is lost during use. Although a spring 58 is shown, any structure or means for providing a force to move the end portion 30 can be used and it can be located in any desired location within the apparatus or associated thereto. For example, magnetic, elastic materials, gravity, and other means can be used, if desired. In certain embodiments, the bands 40 themselves can act as springs to help return the device 10 to the desired configuration.

Figure 9:
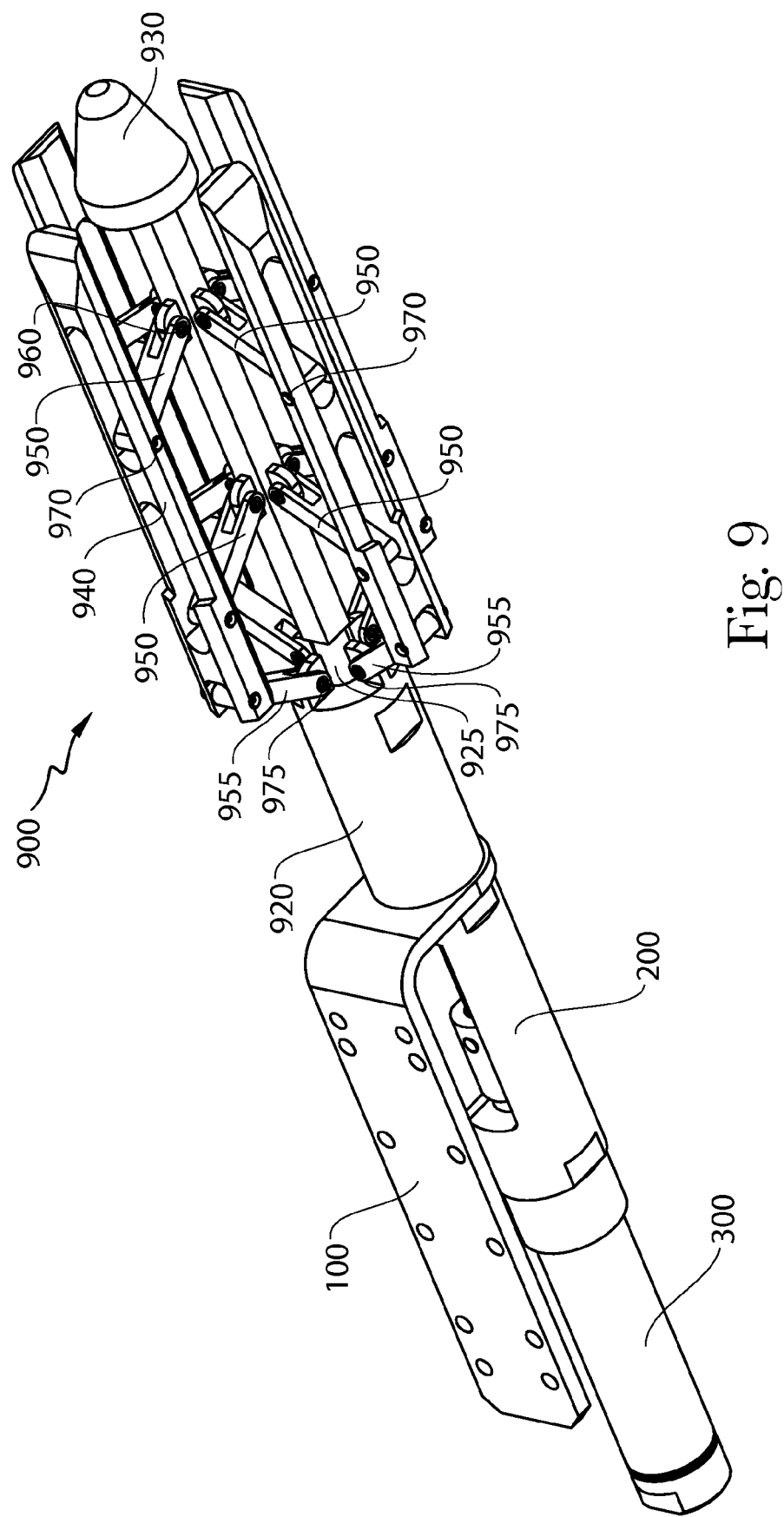
FIG. 9 is an isometric view of an alternative embodiment of the present invention.

In FIG. 9, an alternative embodiment of the present invention is shown. In this exemplary embodiment, the apparatus 900 includes a base portion 920 and an optional end portion 930. The embodiment shown includes a shaft 925 to which the end portion 930 is joined. Shaft 925 extends from the end portion 930 into the base portion 920. Shaft 925 is joined to at least one bar 940 by at least one link 950. Shaft 925 is moveable with respect to the base portion 920. In the embodiment shown, shaft 925 is joined to links 950 by joints 960. Links 950 are, in turn, joined to bar 940 by joints 970. Further, the base portion 920 is joined to links 955 by joints 975, which are in turn joined to bars 940 by joints 970. Joints 960, 970 and 975 can be any suitable structure for moveably connecting the bar 940 and link 950 and/or the link 950 and the shaft 925. For example, the joints 960 and 970 may include a pin, a bearing, a pivot, a living hinge, or any other suitable moveable connection. Further, as shown, one or more of the bars 940 can be hingedly joined to the base 920. Thus, when the shaft 925 is moved relative to the base 920, the bars 940 move away from or toward the centerline C of the apparatus 900. For example, in the embodiment shown, when the end portion 930 is moved in a direction away from the base portion 920, the bars 940 will move toward the centerline C of the apparatus 900. Likewise, as the end portion 930 is moved in a direction toward the base portion 920, the bars 940 will move in a direction generally away from the longitudinal centerline C of the apparatus 900. Of course, the linkage can be designed and configured to move in any way desired, and the embodiment disclosed herein is just one of many possible configurations of the present invention.

Bars 940 can be made of any suitable material and take on any desired shape. In the embodiment shown, the bars 940 are longitudinally extending and have a somewhat curved outer surface. There are four bars 940 in the embodiment shown that are spaced evenly about the perimeter of the device 900, but there could be any number of bars 940. Further, there can be any suitable number of links 950 and 955 and joints 960, 970 and 975. The bars 940 and links 950 may be rigid or flexible. In certain embodiments, the bars 940 and links 960 are made of a metal material and in others they are made from plastic. In yet other embodiments, the apparatus 900 may have parts made of other materials, including one or more different materials.

The engaging apparatus 10 of the present invention has many uses in manufacturing and handling articles of manufacture. For example, it can be used as a picker to pick up packages or other articles. It can also be use to hold articles for processing and/or transport. One example of something for which the engaging apparatus 10 of the present invention is particularly useful is for picking up and moving packages such as bottles, tubes, cartons or the like. In such operations, the engaging member 10 can be positioned adjacent the opening of the article such that the end portion 30 is fully or partially extended away from the base portion 20. Accordingly, one or more of the bands 40 is not activated. In this configuration, the apparatus 10 can be moved into the opening of the article. The end portion 30 can then be moved toward the base portion 20 to flex one or more of the bands 40 and to activate the apparatus 10. The bands 40 then extend outwardly from the centerline C of the apparatus 10 and increase the diameter of the apparatus 10.

In a typical process, the end portion 30 is moved toward the base portion 20 until at least one of the bands 40 contacts the inside of the article into which the apparatus 10 is disposed. In certain embodiments, two or more of the bands 40 will contact the inside of the article. The bands 40 act to engage, or grab, the article. In certain embodiments, the bands 40 may also provide a way to align or stabilize the article. Also, the bands 40 may be used to expand the article or to provide it with a particular shape.

The apparatus 10 of the present invention may also be configured such that one or more of the bands 40 or bars 940 moves at a different time and or amount than other bands/bars. This can be useful for more complex articles of manufacture and/or when the apparatus 10 is used during different steps of the process. For example, some of the bands/bars may be activated at one time or to one extent and then other bands/bars may be activated at a different time or to a different extent, for example, first to grab the item and then to stabilize it.

In any case, the apparatus 10 can have any number of different uses, such as, for example, to pick up, hold and/or move articles of manufacture. Further, when an article is in a state or position to be removed from the engaging apparatus 10, the bands 40 may be disengaged by moving the end portion 30 away from the base portion 20. Alternatively, the article can be pulled off the apparatus 10 by other means. Thus, the apparatus 10 of the present invention is adaptable to different manufacturing and handling needs.

The engaging apparatus 10 is also adaptable to different sized and shaped articles due to the flexibility of the bands 40. For example, so long as the end portion 10 can pass into the article to be picked up, the apparatus 10 should be easily configured to pick up and hold the article. However, if a different sized or shaped article is to be handled, the same apparatus 10 can be used so long as the end portion 30 can fit into an opening of the article and the bands 40 can extend to provide an activated cross-section D2 that is greater than the opening of the article. This is especially useful where articles of different sizes and/or shapes are handles on a single line, such as tubes of toothpaste, bottles of detergent, packages of food etc.

Another advantage of the present invention is that the engaging apparatus 10 can be configured to allow for rapid repair and/or changing of its characteristics. For example, one or more of the bands 40 can be removed and/or replaced with a new or different band 40. This can help reduce the operating costs associated with apparatus 10 and increase its operating range significantly. Alternatively, the apparatus 10 can be exchanged in whole with other engaging apparatus parts having different sizes, shapes or other characteristics.

Figure 10:
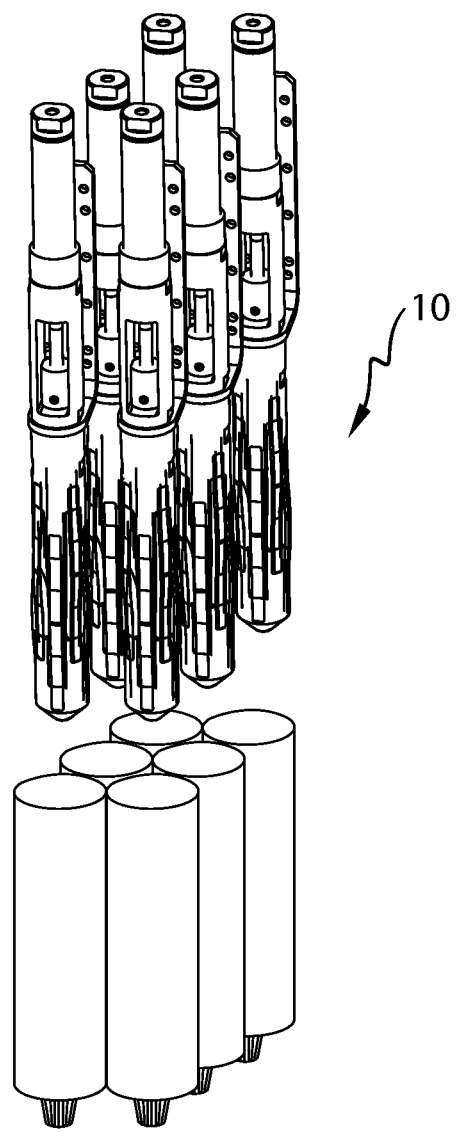
FIG. 10 is an isometric view of an embodiment of the present invention as it might be used in a process for handling tubes.
Figure 11:
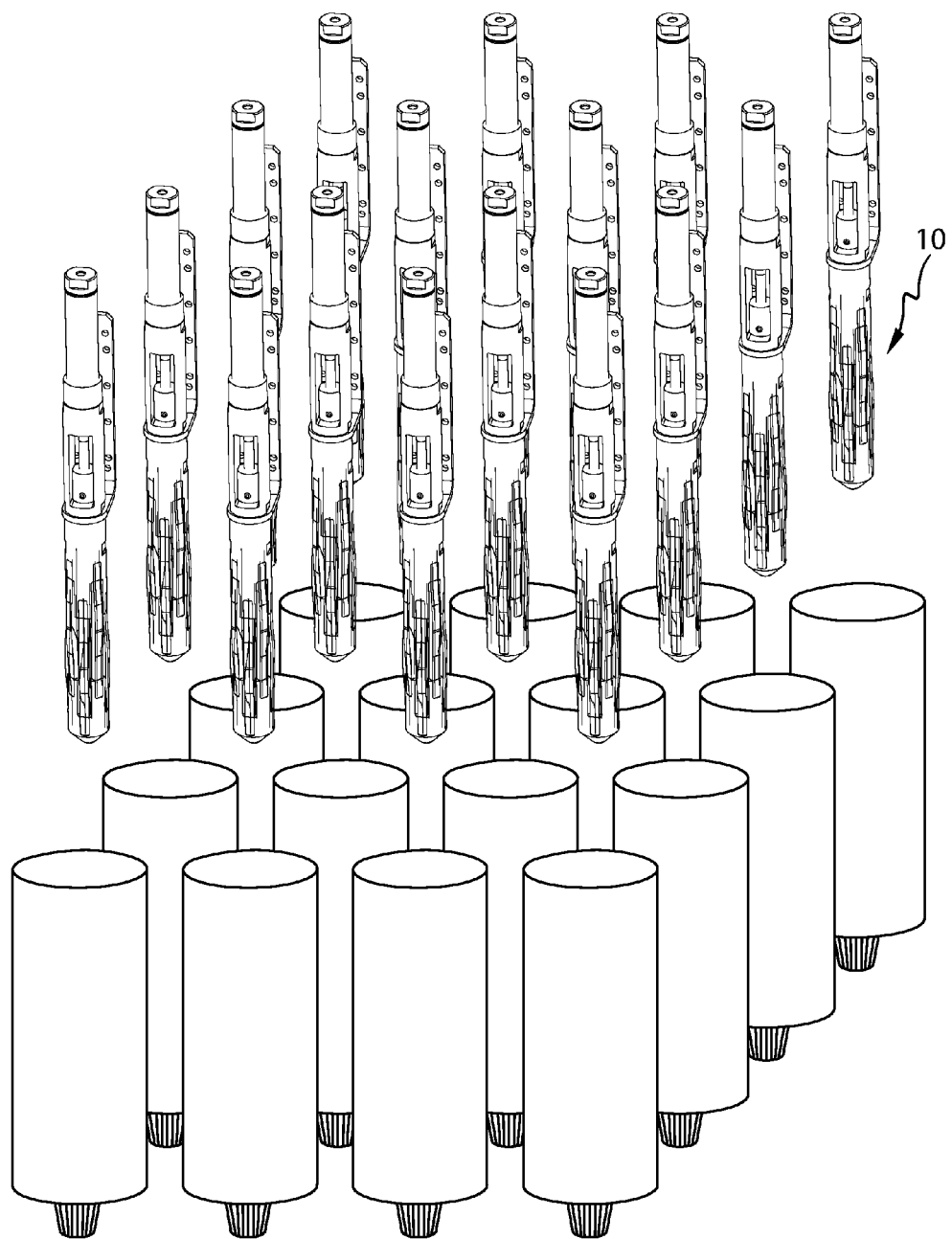
FIG. 11 is an isometric view of an embodiment of the present invention as it might be used in a process for handling tubes of a different size than those in FIG. 10.

The engaging apparatus 10 of the present invention may be used alone or in tandem with one or more other engaging devices such as the engaging apparatus 10 of the present invention. For example, it is fairly typical in high-speed production lines to have several articles be worked on at the same time. Thus, there may be a desire to have two or more devices for engaging different articles at the same time. Alternatively, two or more devices could be used to engage a single article. One beneficial feature of the present invention is that the disengaged cross-section D1 of the engaging device 10 can be relatively small when the device is disengaged, as in FIG. 1, and the activated cross-section D2 of the apparatus 10 in an activated configuration (e.g. FIG. 4) can be relatively large. The relatively small disengaged cross-section D1 allows for a small pitch between the apparatuses 10 if more than one is used. Again, this provides for flexibility in the manufacturing process by allowing the engaging apparatuses 10 to be used for small articles that are closely spaced (e.g. as shown in FIG. 10) and also used for larger articles or articles that are more spaced apart (e.g. as shown in FIG. 11).

Figure 12:
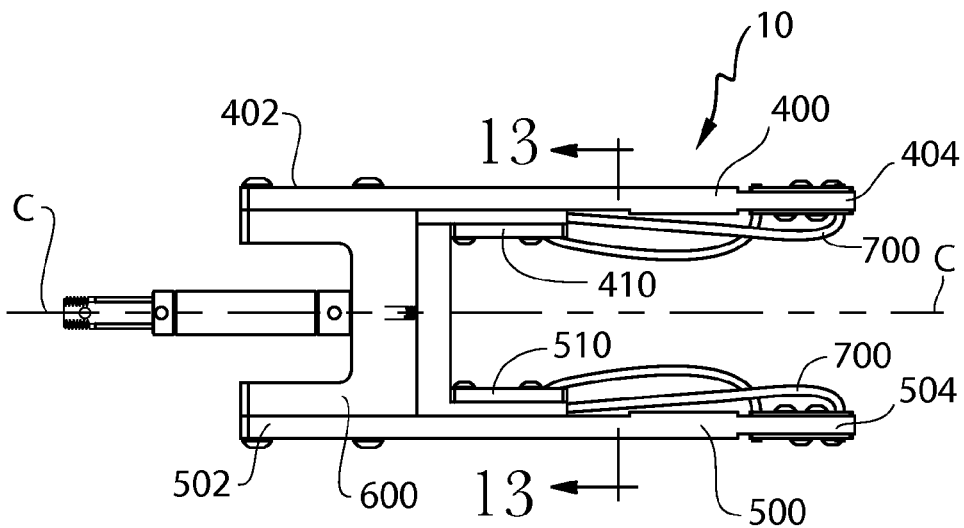
FIG. 12 is a plan view of an alternative embodiment of the present invention.
Figure 13:
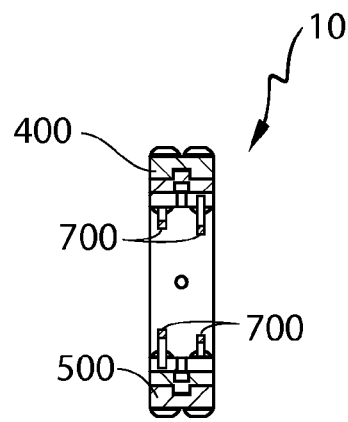
FIG. 13 is a cross-sectional view of the device shown in FIG. 12, through line 13-13.
Figure 14:
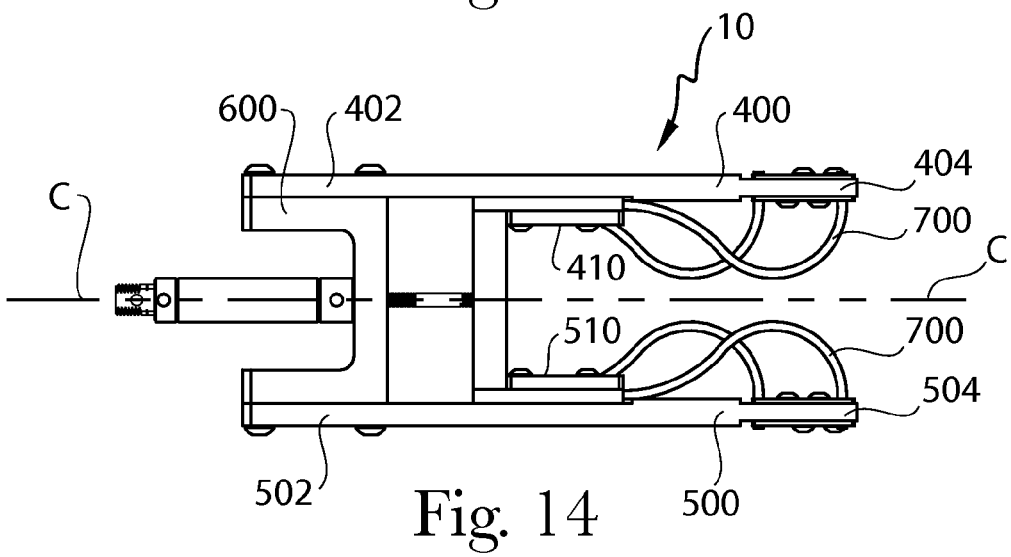
FIG. 14 is a plan view of the device shown in FIG. 12 shown in an activated configuration.

In another embodiment of the present invention, the engaging apparatus 10 may be configured to provide an engaging force in the direction of the centerline C of the apparatus 10. One exemplary embodiment is shown in FIGS. 12-14. As shown in FIG. 12, the engaging apparatus 10 is configured to have two arms 400 and 500 which extend from a common base portion 600, each arm having a longitudinal centerline, a base end portion 402 and 502 and a free end portion 404 and 504. The base portion 600 need not be common to both arms 400 and 500, but rather, can be a separate piece for each arm. Further, the number of arms is not limited to two, but rather can be any number desired for the particular application.

In the embodiment shown in FIG. 12, both of the arms 400 and 500 are joined to the base portion 600 at their base ends 402 and 502. The first free end portion 404 extends from the first base end portion 402 and the second free end portion 504 extends from second base end portion 502. Further, each arm includes a moveable portion that is moveable relative to the free end portion 600. Moveable portion 410 is associated with arm 400 and moveable portion 510 is associated with arm 500. The moveable portions 410 and 510 may be joined to each other or separate and can act in tandem or independently of each other. In the embodiment shown, bands 700 extend from the first free end portion 404 of arm 400 to moveable portion 410 and from the second free end portion 504 of arm 500 to moveable portion 510. Other embodiments, however, are contemplated wherein bands 700 are only one disposed on one arm portion, wherein only one arm has a moving portion, or where the bands 700 extend from the moveable portions 410 and 510 to the base portion 600. Further, although the moveable portions 410 and 510 are shown to be disposed near the portion of the arms 400 and 500 that are located nearest the base portion 600, the moveable portions 410 and 510 may be located anywhere along the length of the arms. If the moveable portions 410 and 510 are located adjacent the free end portions 404 and 504, then the bands 700 may extend from the moveable portions 410 and 510 to respective portions along the length of the arms 400 and 500 or to the base portion 600.

FIG. 13 shows a cross-sectional view of the apparatus 10 of FIG. 12 through section line M-M. Although the arms 400 and 500 are shown to be similar in dimensions and configuration, they need not be so. As noted above, there can be any number of arms and each arm can be the same or different from one or more of the other arms. In addition, two or more of the arms 400 and 500 can be joined to each other at their free end portions 404 and 504 or anywhere else along the length of the arms. Further, the arms can be formed into a unitary structure like a cylinder, box or other structure that completely or partially surrounds the article of manufacture the device 10 is intended to engage. Thus, the apparatus 10 of the present invention can be customized for a very specific purpose or can be more generic in the sense that a single design can be used for different uses and/or products.

When either one or both of the moveable portions 410 and 510 is moved relative to the base portion 600, the bands 700 joined to that moveable portion are flexed, as shown in FIG. 14. For example, if the bands 700 are in a disengaged configuration, moving the moveable portion away from the base portion 600 and towards the free end portion of the arm will cause the bands to flex toward the centerline C of the apparatus. If the apparatus 10 is in an activated configuration with one or more of the bands 700 flexed, moving the movable portions 410 and 510 toward the base portion 600 and away from the free end portions 404 and 504 will deactivate and disengage the apparatus 10.

Flexing of the bands 700 is similar to that described above with respect to the embodiment shown in FIGS. 1-6. The difference between the embodiment shown in FIGS. 12-14 and those shown in FIGS. 1-6 is that at least some of the bands 700 in the embodiment shown in FIGS. 12-14 extend toward the centerline C of the engaging apparatus 10 rather than away from it as they do in the previously described embodiments. In certain embodiments, the bands 700 move toward the centerline of at least one of the other engaging arms. This extension of the bands 700 provides a means for engaging an article of manufacture between the arms 400 and 500. Thus, embodiments having this engaging configuration can be used to pick up, hold and move articles. This can be advantageous if it is desired to engage an outer surface of an article or wherein it is preferred to hold some portion of the article between two or more engaging or gripping elements.

The alternative design features and configurations related to the bands, the base portion, the moveable portion(s), the adapter housing, cylinder and other features of the engaging apparatus 10 or structures to which it is attached or associated are applicable to the different embodiments described herein and those embodiments that fall within the scope of the invention but are not specifically described in detail herein.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for engaging an article, the apparatus having a longitudinal centerline, a disengaged configuration with a disengaged cross-section and an activated configuration with an activated cross-section, the apparatus comprising:
    a base portion;
    an end portion disposed adjacent the base portion along the longitudinal centerline of the apparatus, the end portion being moveable in relation to the base portion generally along the longitudinal centerline of the apparatus; and
    two or more bands, wherein each of the two or more bands has a length and the length of at least one of the two or more bands is different than the length of at least one other of the two or more bands, wherein the two or more bands extend between the base portion and the end portion, the bands each having a first end joined to the base portion, a second end joined to the end portion and a central region located between the first end and the second end, and wherein at least one of the two or more bands bends away from the longitudinal centerline of the apparatus when the end portion is moved toward the base portion from the disengaged configuration to the activated configuration.

2. The apparatus of claim 1 having a first band and a second band,
    wherein the first band is joined to the base portion at a first location in a longitudinal direction and the second band is joined to the base portion at a second location in the longitudinal direction and the first location and the second location are different.

3. The apparatus of claim 1 having a first band and a second band, wherein the first band is joined to the end portion at a first location in a longitudinal direction and the second band is joined to the end portion at a second location in the longitudinal direction and the first location and the second location are different.

4. The apparatus of claim 3, wherein the first band is joined to the base portion at a third location in a longitudinal direction and the second band is joined to the base portion at a fourth location in the longitudinal direction and the third location and the fourth location are different from each other.

5. The apparatus of Claim 1 having six or more bands joined to each of the base portion and the end portion and extending between the base portion and the end portion.

6. The apparatus of claim 5 having a first series of three bands and a second series of three bands, wherein the first series of three bands is joined to the end portion at a first location in a longitudinal direction and the second series of three bands is joined to the end portion at a second location in the longitudinal direction and the first location and the second location are different.

7. The apparatus of claim 6, wherein the first series of three bands is joined to the base portion at a third location in a longitudinal direction and the second series of three bands is joined to the base portion at a fourth location in the longitudinal direction and the third location and the fourth location are different from each other.

8. The apparatus of Claim 1 wherein at least a portion of the distal end of at least one of the two or more bands is disposed in a first recess in the end portion.

9. The apparatus of claim 8 wherein at least a portion of the proximal end of at least one of the two or more bands is disposed in a second recess in the base portion.

10. The apparatus of claim 1, wherein the two or more bands have a thickness and at least one of the two or more bands includes one or more slits that extend partially through the thickness of the band.

11. The apparatus of claim 1, wherein at least one of the two or more bands includes a portion that is hardened, weakened, roughened, smoothened, coated or otherwise modified.

12. The apparatus of claim 1, wherein the end portion has a free region disposed away from the base portion that is at least partially tapered to have a free region cross-section that is smaller than the maximum cross-section of the end portion.

13. The apparatus of claim 1, further including a shaft extending from the end portion to the base portion, the shaft having a distal end joined to the end portion and a proximal end slideably disposed at least partly through an opening in the base portion.

14. The apparatus of claim 13, wherein the shaft has a cross-section that is non-circular.

15. The apparatus of claim 1 further including a spring operatively associated with the end portion, the spring adapted to return the end portion to its disengaged configuration after it has been moved to its activated configuration or to return the end to its activated configuration after it has been moved to its disengaged configuration.

16. A method for engaging an article having an opening, the method including the steps of:
    providing an article with an opening therein;
    providing an apparatus for engaging an article, the apparatus being provided in a disengaged configuration and having a longitudinal centerline, a base portion, an end portion disposed adjacent the base portion along the longitudinal centerline of the apparatus wherein the end portion is moveable in relation to the base portion generally along the longitudinal centerline of the apparatus, and two or more bands extending between the base portion and the end portion wherein the two or more bands have a first end joined to the base portion, a second end joined to the end portion and a central region located between the first end and the second end, and the bands each have a length, wherein the length of at least one of the bands is different from the length of at least one other of the bands;
    positioning at least a portion of the apparatus into the opening of the article while the apparatus is in the disengaged configuration; and
    activating the apparatus by moving the end portion is moved toward the base portion such that at least the central portion of one of the two or more band bends away from the longitudinal centerline of the apparatus and engages the article.

17. The method of claim 16 wherein the base has an opening therein, and the apparatus has a shaft extending from the end portion to the base portion,
    wherein the shaft has a distal end joined to the end portion and a proximal end slideably disposed at least partly through the opening in the base portion.

18. The method of claim 16, wherein the article to be engaged is a tube, bottle, box or other package.

19. The method of claim 16 including the further step of moving the article from a first position to a second position.

20. The method of claim 16 including the further step of disengaging the engaging apparatus by moving the end portion away from the base portion so as to move at least the central portion of the two or more bands that bent away from the longitudinal centerline of the apparatus when activated back toward the longitudinal centerline of the apparatus.

\* \* \* \* \*